(No Model.)

B. W. COOK & W. W. REID.
APPARATUS FOR FORMING MILK OF LIME.

No. 538,577. Patented Apr. 30, 1895.

Witnesses.

Inventors.
William W. Reid.
Benjamin W. Cook.
By
Atty.

UNITED STATES PATENT OFFICE.

BENJAMIN W. COOK, OF PORT ALLEN, AND WILLIAM W. REID, OF NEW ORLEANS, LOUISIANA.

APPARATUS FOR FORMING MILK OF LIME.

SPECIFICATION forming part of Letters Patent No. 538,577, dated April 30, 1895.

Application filed January 10, 1895. Serial No. 534,474. (No model.)

*To all whom it may concern:*

Be it known that we, BENJAMIN W. COOK, residing at Port Allen, in the parish of West Baton Rouge, and WILLIAM W. REID, residing at New Orleans, in the parish of Orleans, State of Louisiana, citizens of the United States, have invented certain new and useful Improvements in Apparatus for Forming Milk of Lime; and we do hereby declare that the following is a full, clear, and exact description of the same, reference being had to the annexed drawings, making a part of this specification, and to the figures of reference marked thereon.

Our invention relates to improvements in apparatus for forming milk of lime, and has for its object to provide an efficient, simple, and inexpensive device for the formation of the milk of lime commonly used in the purification of cane juice in the manufacture of sugar, and to this end our invention consists in the novel features and in the construction and arrangement of parts hereinafter fully described and afterward definitely pointed out in the claims following the description, due reference being had to the accompanying drawings forming a part of this specification, wherein—

Figure 1:
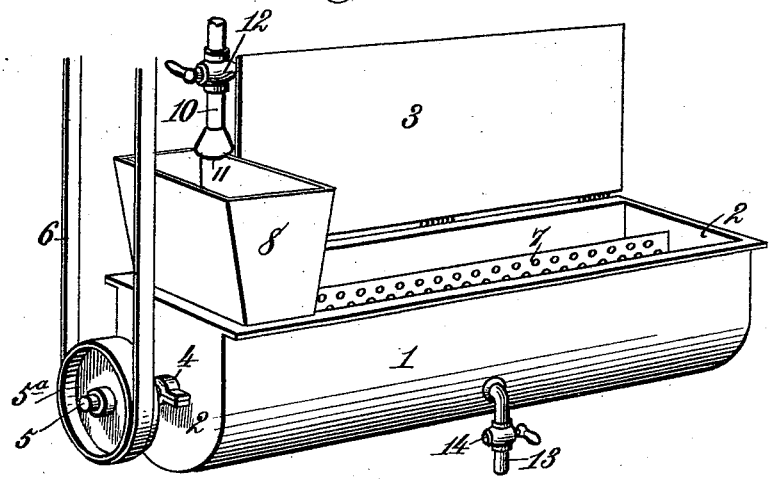
Figure 2:
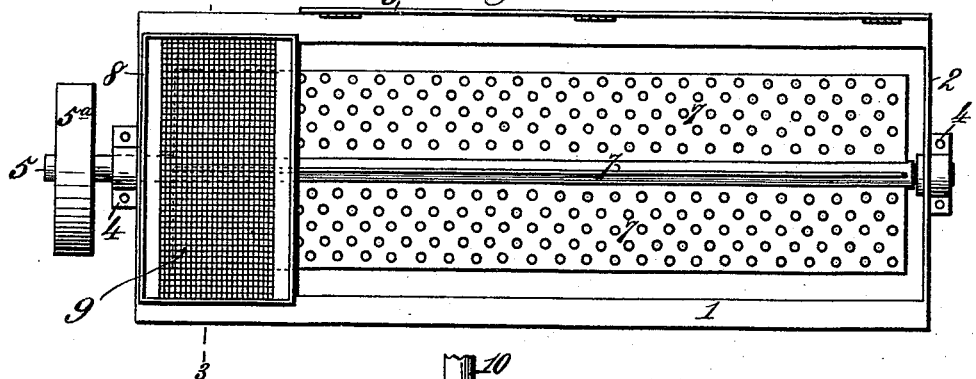
Figure 3:
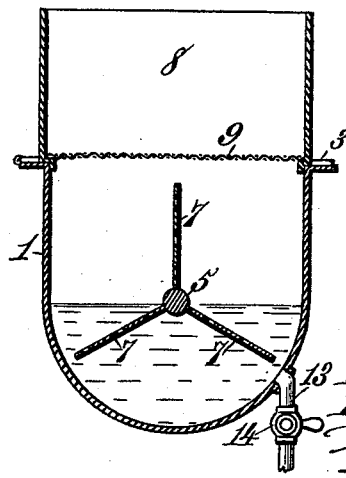

Figure 1 is a perspective view of our improved apparatus. Fig. 2 is a top plan view thereof. Fig. 3 is a transverse section of the same.

In the manufacture of sugar it is a common practice to treat the cane juices or saccharine solutions with lime in solution, termed milk of lime, for the purpose of purification, the lime operating to neutralize the vegetable acids in the cane juice. In order to facilitate the preparation or production of the milk of lime employed for this purpose, we have devised the apparatus which we will now proceed to describe.

Referring to the drawings, the numeral 1 indicates a vat which we have illustrated as consisting of a trough shaped metallic tank having a rounded bottom and closed at its opposite ends by heads 2, 2, and provided with a hinged lid or cover 3; but it will be manifest that the vat may be made of any form, or of any material that may be best adapted for individual cases. Secured to the heads 2, 2, are journal boxes 4, 4, within which a longitudinal shaft 5 has its bearings, one end of said shaft projecting beyond the end of the vat 1 for a suitable distance and having rigidly mounted thereon a pulley 5, by means of which and a power driven belt 6 said shaft is revolved. Arranged upon said shaft and rigidly secured thereto are a series of perforated dashers 7, said dashers preferably radiating from said shaft at equal distances apart and projecting at their outer ends in proximity to the sides and curved bottom of the vat 1. Arranged over one end of said vat and supported thereupon, is a hopper 8 having a foraminous or reticulated bottom 9, and over the open top of said hopper is disposed the discharge or outlet end of a water supply pipe 10, provided with a rose-jet or spraying nozzle 11 and a valve 12. The vat 1, at a point slightly above the lowest point of its curved bottom, is provided with a discharge pipe 13 having a valve 14.

The operation of our improved apparatus is as follows: The vat 1 is supported in any suitable manner over a vat (not shown) into which the cane juice flows from the mill. Lime is placed in the hopper 8 and the valve 12 in the water supply pipe 10 is opened and passing through the nozzle 11 is discharged in a spray over the lime contained in the hopper, and passing through the lime partially dissolves the same and escapes through the foraminous or reticulated bottom into the tank 1 where the perforated dashers thoroughly agitate and intimately mix the lime and water. The foraminous or reticulated bottom of the hopper prevents insoluble portions of the lime and foreign substances from passing therethrough, permitting only the lime that is dissolved by the water to pass into the tank. When the lime and water have been thoroughly intermixed, the valve 14 in the discharge pipe 13 is opened, permitting the saturated lime solution to flow into the vat that receives the cane juice as it flows from the cane mill and mix therewith, and from which the cane juice and the milk of lime pass to the sugar making machinery. By connecting the discharge pipe 13 to the vat at a point slightly above the bottom of the latter, any lime or insoluble ingredients that have not been dissolved are prevented from escaping into the cane juice vat.

By arranging the vat 1 immediately above the cane juice vat and constituting it a part of the sugar making plant, we are enabled to discharge the milk of lime directly into the cane juice as it comes from the mill before any portion of the lime has had an opportunity to be precipitated, thus preventing the discharge of any portion of the lime in a solid form into the saccharine solution.

Having described our invention, what we claim is—

1. In an apparatus for forming milk of lime, the combination with a vat, of a rotary shaft journaled therein and carrying perforated radial dashers, a hopper supported upon the upper open end of said vat and provided with a reticulated bottom, a water supply pipe having a spraying nozzle arranged over the upper open end of said hopper, a movable cover for the vat and a valved discharge pipe communicating with said vat near its bottom and at a point remote from the hopper, substantially as described.

2. In an apparatus for forming milk of lime, the combination with a vat provided with a hinged lid, of a rotary-shaft journaled in boxes secured to the opposite ends of the vat, perforated radial dashers carried by said shaft, means for driving the shaft, a valved outlet communicating with said vat at a slight distance above the bottom of the latter, a hopper supported over said vat at one end thereof and provided with a reticulated bottom, and a valved water supply pipe provided with a spraying nozzle disposed over said hopper, substantially as described.

In testimony whereof we have hereunto subscribed our names in the presence of two witnesses.

BENJAMIN W. COOK.
WILLIAM W. REID.

Witnesses:
ROBT. E. RIES,
SIDNEY ROBINSON.